(12) United States Patent
Neelappa

(10) Patent No.: US 9,222,574 B2
(45) Date of Patent: Dec. 29, 2015

(54) CANTILEVER SPRING TYPE DETENT ASSEMBLY

(71) Applicant: GM Global Technology Operations LLC, Detroit, MI (US)

(72) Inventor: Ganesha Neelappa, Chikkamaradi (IN)

(73) Assignee: GM Global Technology Operations, LLC, Detroit, MI (US)

( * ) Notice: Subject to any disclaimer, the term of this patent is extended or adjusted under 35 U.S.C. 154(b) by 352 days.

(21) Appl. No.: 13/847,780

(22) Filed: Mar. 20, 2013

(65) Prior Publication Data

US 2014/0283640 A1 Sep. 25, 2014

(51) Int. Cl.
*F16H 63/38* (2006.01)
*F16H 59/02* (2006.01)
*F16H 63/30* (2006.01)

(52) U.S. Cl.
CPC .......... *F16H 59/0278* (2013.01); *F16H 63/302* (2013.01); *F16H 63/38* (2013.01); *Y10T 74/20122* (2015.01)

(58) Field of Classification Search
CPC ... F16H 59/10; F16H 61/22; F16H 2061/226; F16H 2061/247; F16H 2061/243; F16H 63/32; F16H 63/34; F16H 63/38
USPC ................. 74/473.1, 473.18, 473.21, 473.22, 74/473.24, 473.25, 473.26, 473.27, 74/473.33, 473.36, 335, 337.5
See application file for complete search history.

(56) References Cited

U.S. PATENT DOCUMENTS

| 3,765,261 | A | * | 10/1973 | Hobbins | 74/473.21 |
| 4,337,675 | A | * | 7/1982 | Holdeman | 74/473.24 |
| 4,605,109 | A | * | 8/1986 | Fukuchi et al. | 192/219 |
| 4,646,584 | A | * | 3/1987 | Okubo et al. | 74/473.21 |
| 5,622,083 | A | * | 4/1997 | Kirimoto et al. | 74/473.21 |
| 6,655,227 | B2 | * | 12/2003 | Aoyama et al. | 74/335 |
| 6,745,878 | B1 | * | 6/2004 | Jensen | 192/3.63 |
| 7,270,027 | B2 | * | 9/2007 | Berger et al. | 74/473.24 |
| 7,654,170 | B2 | | 2/2010 | Wittkopp | |
| 7,686,733 | B2 | | 3/2010 | Hun | |
| 7,707,905 | B2 | | 5/2010 | Haka | |
| 8,776,630 | B2 | * | 7/2014 | Suh | 74/473.1 |
| 2001/0025535 | A1 | * | 10/2001 | Kamiya | 74/335 |
| 2006/0169083 | A1 | * | 8/2006 | Matsuda | 74/473.1 |
| 2007/0137362 | A1 | * | 6/2007 | Kortge et al. | 74/473.18 |
| 2011/0061487 | A1 | | 3/2011 | Tooman et al. | |
| 2012/0137805 | A1 | | 6/2012 | Oh et al. | |
| 2014/0283641 | A1 | * | 9/2014 | Neelappa | 74/473.33 |

OTHER PUBLICATIONS

Pictures taken of Hyundai Eon transmission outside of United States.
Pending U.S. Appl. No. 13/847,774, filed Mar. 20, 2013, by Ganesha Neeiappa. All pages.

* cited by examiner

*Primary Examiner* — Ha D Ho
*Assistant Examiner* — Jude Agendia

(57) ABSTRACT

A detent assembly for selectively engaging a gear in a transmission of a motor vehicle is provided. The detent assembly includes a lever having a first groove and a second groove formed therein. The lever is configured to selectively engage a gear. A ball is provided, which is configured to selectively seat in the first groove, the further, to selectively seat in the second groove. A plate is configured to selectively bias the ball into the first groove, and the plate is further configured to selectively bias the ball into the second groove.

20 Claims, 7 Drawing Sheets

CANTILEVER SPRING TYPE DETENT ASSEMBLY

FIELD

The present disclosure relates to mechanisms used for shifting vehicular transmissions and more particularly to a shift detent assembly for a vehicular transmission.

BACKGROUND

The statements in this section merely provide background information related to the present disclosure and may or may not constitute prior art.

Gear changes in manual and dual clutch transmissions are generally achieved by clutches, such as synchronizer clutches, which are splined to and which rotate with an associated shaft. Adjacent to each clutch is one or a pair of gears which provide distinct gear or speed ratios. Each clutch is movable to couple the gear to the shaft and drive torque is then applied to the engaged gear or shaft.

For example, a shifter assembly engages a yoke that is coupled to a shift rail. When the shifter assembly moves the yoke, the shift rail and the attached clutches are moved, which engage a gear on one side of clutch. In some cases, the rail can be axially moved in an opposite direction by the yoke to engage the clutch with a second gear disposed on an opposite side of the clutch. Accordingly, each yoke is typically coupled to a dedicated rail, and one or two gears can be activated by the clutch on a particular rail.

In addition, to engage a reverse gear (or another gear), one of the yokes may engage a reverse lever that rotates about a pivot point. The reverse lever is operable to selective engage the reverse gear. A dedicated shift rail and yoke is used for the rotating reverse lever, which typically includes a coil spring and ball for detent actuation.

Because each shift rail occupies space in the transmission and requires mounting bosses and/or linear bearings, the shift rails add to the complexity and cost of a transmission. Reducing their number is thus desirable.

SUMMARY

The present disclosure provides a cantilever spring type detent assembly for a reverse gear engaging lever. The detent assembly allows the yoke to both rotate the reverse gear engaging lever, and to move with respect to the reverse gear engaging lever in an axial direction.

In one variation, a detent assembly for selectively engaging a gear in a transmission of a motor vehicle is provided. The detent assembly includes a lever having a first groove and a second groove formed therein, the lever being configured to selectively engage a gear. The detent assembly also includes a ball configured to selectively seat in the first groove, and the ball is further configured to selectively seat in the second groove. Further, the detent assembly includes a plate configured to selectively bias the ball into the first groove, and the plate is further configured to selectively bias the ball into the second groove.

In another variation, which may be combined with or separate from the other variations described herein, a detent assembly for selectively engaging a gear in a transmission of a motor vehicle is provided. The detent assembly includes a lever, a ball, a plate, a detent housing, and a retainer ring. The lever has portions forming an opening in the lever. The lever forms a first groove and a second groove therein and a raised portion separating the first and second grooves. The raised portion protrudes into the opening. The lever is rotatable about a pivot point, and the opening is formed through the pivot point. The lever is configured to selectively engage a gear. The ball is configured to selectively seat in the first groove, and the ball is further configured to selectively seat in the second groove. The plate is configured to selectively bias the ball into the first groove, and the plate is further configured to selectively bias the ball into the second groove. The detent housing is cylindrical and is fixedly connected to the plate. The detent housing has a pair of retainer walls formed therein. The pair of retainer walls is disposed adjacent to the ball. The detent housing has an outer wall and an indentation formed in the outer wall. The lever is configured to rotate with respect to the detent housing, wherein the portions forming the opening in the lever are disposed around the outer wall of the detent housing. The retainer ring is disposed around the outer wall of the detent housing in the indentation. The retainer ring, the retainer walls, and the plate cooperating to hold the ball within at least partially within the detent housing. The lever is movable with respect to the ball to selectively seat the ball in the first and second grooves.

In yet another variation, which may be combined with or separate from the other variations described herein, a shifting assembly for a transmission of a motor vehicle is provided. The shifting assembly includes a plurality of shift rails for shifting the transmission into a plurality of gear ratios. A shifting yoke is coupled to a first shift rail of the plurality of shift rails. The shifting yoke is configured to engage a lever, which has portions forming a first groove and a second groove in the lever. A ball is configured to selectively seat in the first groove, and the ball is further configured to selectively seat in the second groove. A plate is configured to selectively bias the ball into the first groove, and the plate is further configured to selectively bias the ball into the second groove. A shaft has a gear disposed thereon. The lever is configured to selectively engage the gear.

Further advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
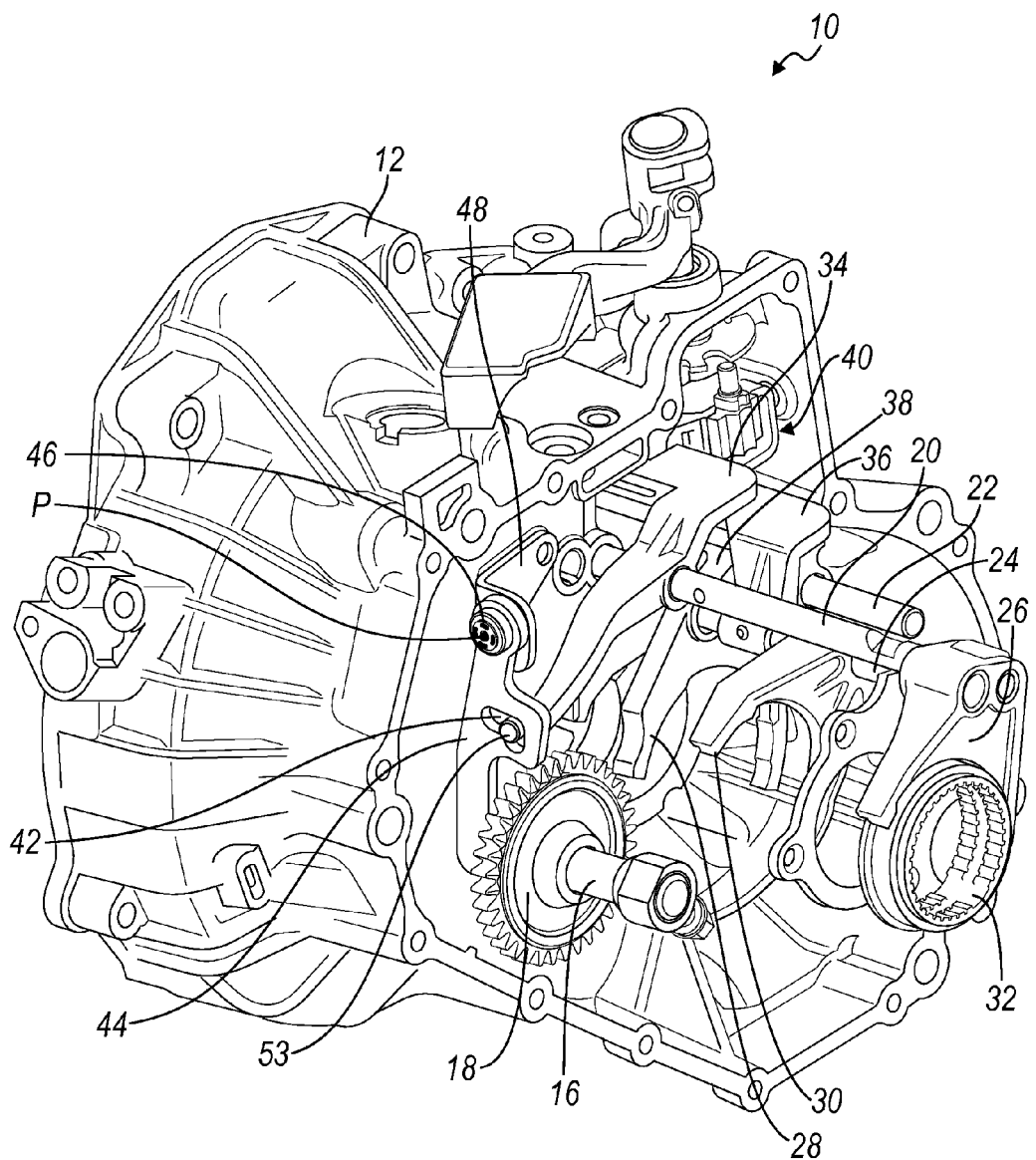
FIG. 1 is a perspective view in partial section of a portion of a transmission incorporating a shifting assembly including cantilever detent assembly according to the principles of the present disclosure.

With reference now to FIG. 1, a portion of a vehicular transmission is illustrated and generally designated by the reference number 10. By way of example, the transmission 10 may be either a manual transmission, a dual clutch transmission (DCT) or other configuration wherein synchronizers and face or dog clutches are utilized to connect a plurality of gears to one or more associated shafts. The transmission 10 includes an exterior housing 12 which typically includes openings, counterbores, shoulders, flanges and the like which locate, receive and retain various components of the transmission 10.

Supported for rotation within the housing 12 on, for example, bearing surfaces or assemblies, are various shafts, one of which, a countershaft or layshaft 16, is illustrated. The countershaft 16 is coupled to a reverse idler gear 18. Other shafts may include a fifth gear and reverse gear shift rail 20 (which could alternatively be another forward gear combined with the reverse gear shift rail), a first/second gear shift rail 22, and a third/fourth gear shift rail 24. Each shift rail 20, 22, 24 has at least one shift fork 26, 28, 30 coupled to the shift rail for activating an adjacent gear (not shown). The shift forks 26, 28, 30 each have a clutch 32 (other clutches not shown) disposed thereon for coupling the shift fork 26, 28, 30 to a gear. For example, the fifth/reverse shift rail 20 is coupled to a shift fork 26, which is coupled to a clutch 32.

Each shift rail 20, 22, 24 also has a shift yoke 34, 36, 38 coupled to the shift rail 20, 22, 24 for axially moving the shift rail 20, 22, 24. For example, the fifth/reverse shift rail 20 has a fifth/reverse yoke 34 coupled to the fifth/reverse shift rail 20. A shifter assembly 40 is operable to axially translate the fifth/reverse shift yoke 34, which axially translates the shift rail 20 and the fifth gear clutch 26.

In FIG. 1, the fifth/reverses shift rail 20 is illustrated in a neutral position without either of the fifth gear (not shown) or the reverse idler gear 18 being engaged. However, when the shift rail 20 and the fifth gear clutch 26 is axially translated to the left (in the orientation of FIG. 1), the fifth gear (not shown) will be engaged. As the fifth/reverse yoke 34 is axially translated, it slides within an L-shaped slot 42 formed in a reverse shift lever 44. When the shift rail is translated to the right (in the orientation of FIG. 1), the fifth/reverse yoke 34 causes the reverse lever 44 to rotate about a pivot point P and engage the reverse idler gear 18, which will be described in further detail below. The reverse lever 44 is part of a cantilever detent assembly 46, which allows the lever 44 to rotate with respect to a bracket 48 attached to the transmission housing 12 when the reverse idler 18 is being engaged, and the cantilever detent assembly 46 exerts a positive hold on the reverse lever 44 in a position that is stationary with respect to the transmission housing 12 when fifth gear is being engaged, which will be described in further detail below.

Figure 2:
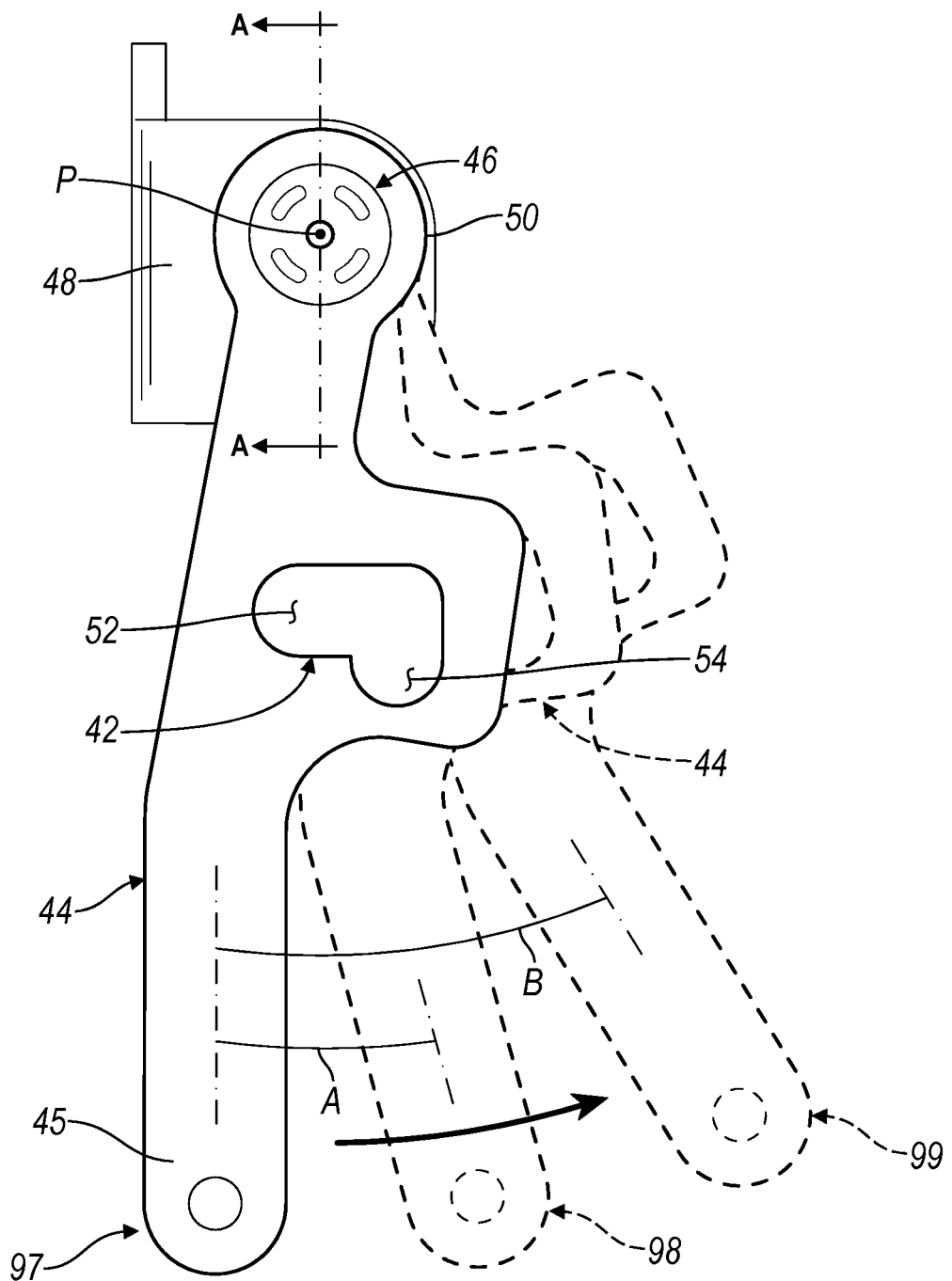
FIG. 2 is a front view of a portion of the cantilever detent assembly shown in FIG. 1, in accordance with the principles of the present disclosure.

Referring now to FIGS. 2, 3A, 3B, 4A, 4B, 5A, 5B, 6A, and 6B, additional details of the reverse lever 44 and the cantilever detent assembly 46 are illustrated. Referring to FIG. 2, the reverse lever 44 is illustrated. A round portion 50 of the reverse lever 44 is assembled with and part of the cantilever detent assembly 46. The reverse lever 44 is configured to rotate about the pivot point P in the center of the round portion 50 of the reverse lever 44. The reverse lever 44 has portions forming the L-shaped slot 42 therein. The L-shaped slot 42 has a long portion 52 that allows a pin 53 of the fifth/reverse yoke (see FIG. 1) to move in a horizontal direction in the long portion 52 of the slot 42 (in the orientation of FIG. 2) when the shift rail 20 is engaging and disengaging from the fifth gear. The L-shaped slot 42 has a short portion 54, which is in communication with the long portion 52 and oriented perpendicular to the long portion 52. When the pin 53 of the fifth/reverse yoke 34 is disposed in the short portion 54 of the L-shaped slot 42, the pin 53 causes the reverse lever 44 to rotate about the pivot point P.

Figure 3A:
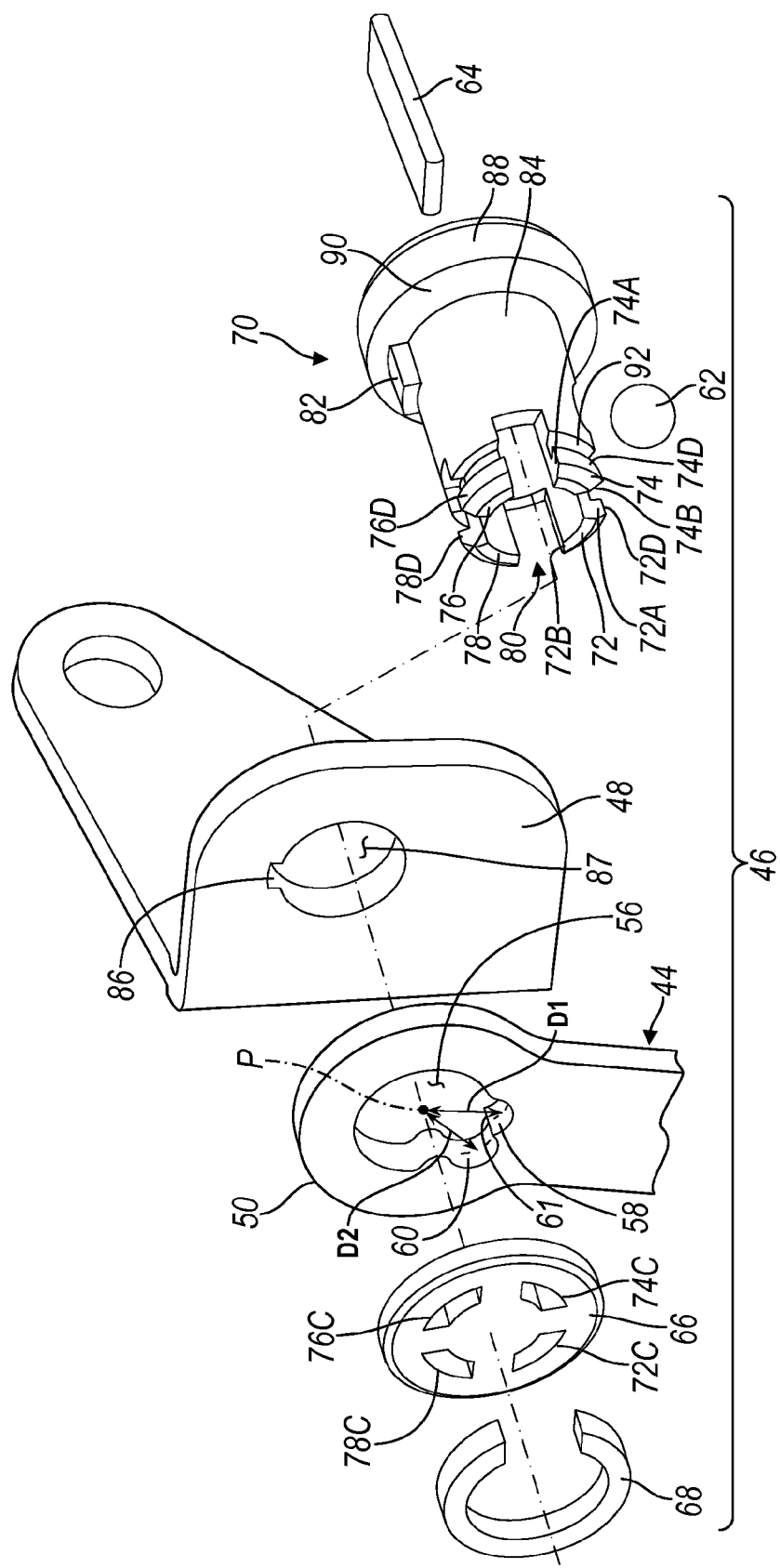
FIG. 3A is an exploded perspective view of the cantilever detent assembly of FIG. 1-2, according to the principles of the present disclosure.
Figure 3B:
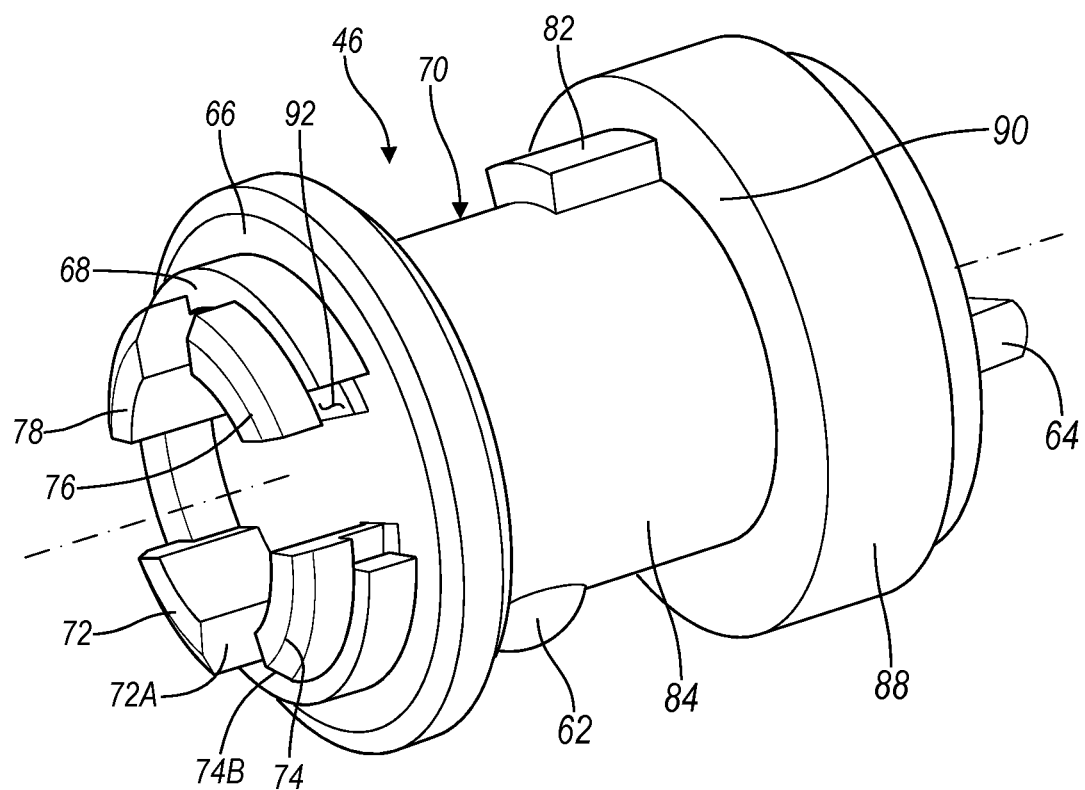
FIG. 3B is an assembled perspective view of a portion of the cantilever detent assembly of FIGS. 1-3A, in accordance with the principles of the present disclosure.

Referring to FIGS. 3A-3B, an exploded view and an assembled view of the cantilever detent assembly 46 is illustrated, though the reverse lever 44 and the bracket 48 are omitted from the assembly view in FIG. 3B. As can be seen in FIG. 3A, the reverse lever 44 defines an opening 56 therein. Thus, the reverse lever 44 has portions forming the opening 56. A first groove 58 and a second groove 60 are formed in the reverse lever 44, at the edge of the opening 56. A raised portion 61 of the reverse lever 44 protrudes into the opening 56 and separates the first and second grooves 58, 60. The detent assembly 46 also has a ball 62, a spring plate 64, a side plate 66, and a retainer ring 68.

In addition, the cantilever detent assembly 46 has a generally cylindrical detent housing 70. The detent housing 70 has four legs 72, 74, 76, 78 extending from an end 80 thereof. Each leg 72, 74, 76, 78 defines opposing retainer wall surfaces. For example, the first leg 72 defines a first retainer wall surface 72A and a second retainer wall surface 72B. Likewise, the second leg 74 defines a first retainer wall surface 74A and a second retainer wall surface 74B.

When the cantilever detent assembly 46 is assembled, the detent housing 70 is fixedly connected to the bracket 48, the side plate 66, the retainer ring 68, the spring plate 64, and the transmission housing 12. The detent housing 70 has a projection 82 extending from its cylindrical outer wall 84, and the projection mates with an indentation 86 formed in the bracket 48. The detent housing 70 has a cylindrical end hub 88 that is disposed adjacent to the cylindrical outer wall 84, and the cylindrical end hub 88 has a greater outer diameter than the outer diameter of the cylindrical outer wall 84 of the detent housing 70. Thus, the end hub 88 has a horizontal surface 90 that is disposed in contact with the bracket 48 when the cantilever detent assembly 46 is assembled. The outer wall 84 extends through an aperture 87 in the bracket and the opening 56 of the lever 44 when the cantilever detent assembly 46 is assembled. The portions of the lever 44 forming the opening 56 in the lever 44 are disposed around the outer wall 84 of the detent housing 70.

In addition, when the cantilever detent assembly 46 is assembled, the legs 72, 74, 76, 78 are each disposed through a mating hole 72C, 74C, 76C, 78C formed through the side plate 66. The retainer ring 68 is disposed in an indentation 92 formed in the outer wall 84 of the detent housing 70. A lip 72D, 74D, 76D, 78D formed on each of the legs 72, 74, 76, 78 locks each leg 72, 74, 76, 78 to the retainer ring 68.

In addition, when the cantilever detent assembly 46 is assembled, the ball 62 is disposed adjacent to a pair of the retainer walls. In the embodiment illustrated in FIGS. 3A and 3B, the ball 62 is disposed adjacent to the first retainer wall 72A of the first leg 72 of the detent housing 70, and the ball 62 is disposed adjacent to the second retainer wall 74B of the second leg 74 of the detent housing 70. The spring plate 64, which is fixedly attached to the detent housing 70 is disposed adjacent to the ball 62. Thus, the retainer walls 72A, 72B cooperate with the spring plate 64, the reverse lever 44, and the side plate 66 (which is held to the detent housing 70 by the retainer ring 68) to hold the ball 62 at least partially within the detent housing 70.

Figure 4A:
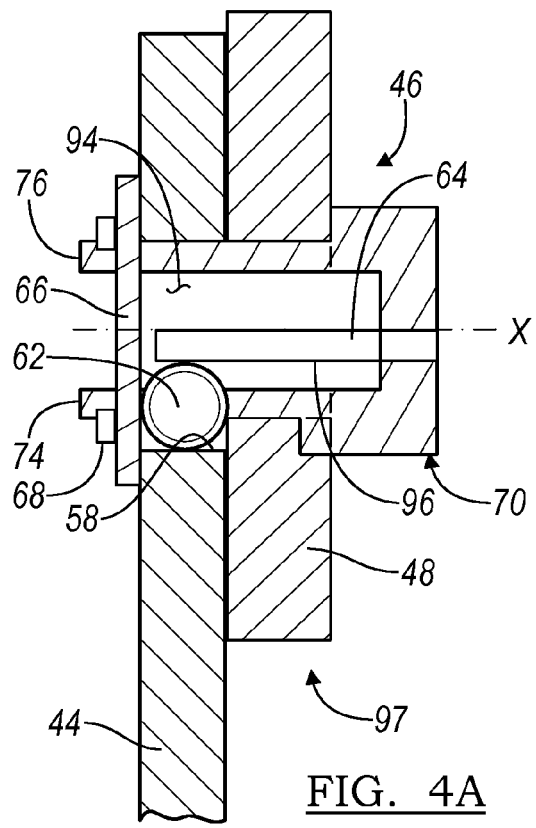
FIG. 4A is a side cross-sectional view of the cantilever detent assembly of FIGS. 1-3B in a first position, taken along the line A-A of FIG. 2, according to the principles of the present disclosure.
Figure 4B:
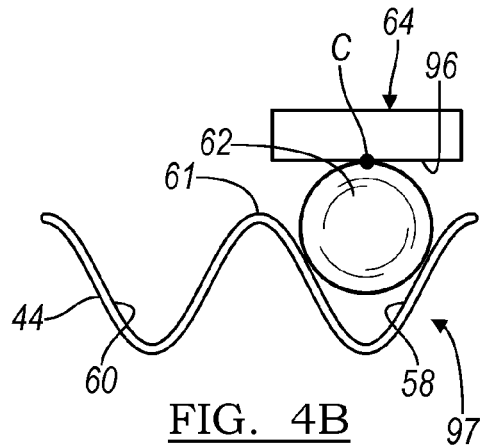
FIG. 4B is a schematic view of a portion of the cantilever detent assembly of FIGS. 1-4A in the first position, in accordance with the principles of the present disclosure.
Figure 5A:
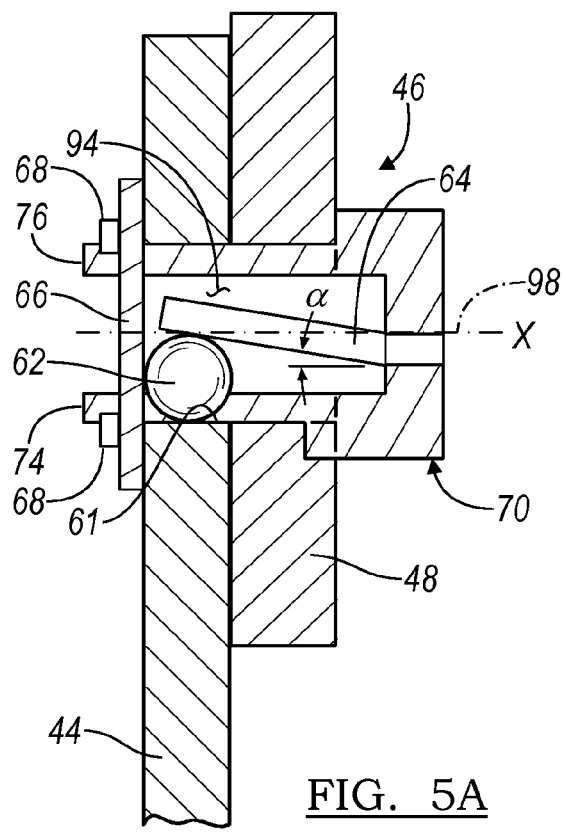
FIG. 5A is a side cross-sectional view of the cantilever detent assembly of FIGS. 1-4B in a second position, taken along the line A-A of FIG. 2, according to the principles of the present disclosure.

Referring now to FIGS. 4A-4B and 5A-5B, the motion of the cantilever detent assembly 46 will be described in further detail. As can be seen in FIGS. 4A and 5A, the spring plate 64 extends into a central cavity 94 formed in the detent housing 70. In FIGS. 4A-4B, the ball 62 is disposed in the first groove 58 of the reverse lever 44. A wall 96 of the spring plate 64 biases the ball 62 into the first groove 58 of the reverse lever 44, and the spring plate 64 is disposed in a horizontally flat orientation (in the orientation of FIG. 4A). In other words, the spring plate 64 is parallel to or collinear with a central axis X of the detent housing 70. When the ball 62 is biased into the first groove 58, the lever is in a neutral position or in fifth gear, and the reverse lever 44 is in a first position 97. As shown in solid lines in FIG. 2 in the first position 97 (also, the first position 97 is shown in FIGS. 4A-4B), the reverse lever 44 is in a vertical position. The reverse lever 44, however, is configured to rotate with respect to the detent housing 70, the bracket 48 and the spring plate 64. Thus, the portions of the reverse lever 44 forming the opening 56 rotate around the outer wall 84 of the detent housing 70.

Figure 4C:
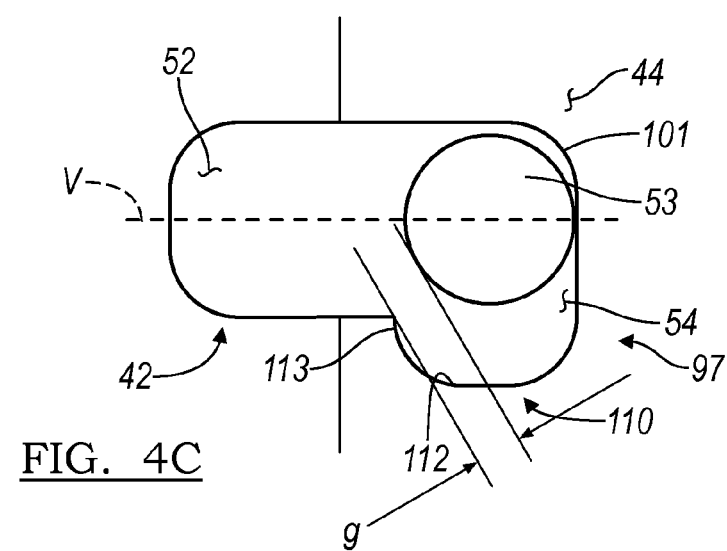
FIG. 4C is a schematic of a portion of the shifting assembly of FIG. 1 including a portion of the cantilever detent assembly of FIGS. 1-4B in the first position, according to the principles of the present disclosure.

FIG. 4C illustrates the position of the lever 44 with respect to the pin 53 in close-up detail, when the lever 44 is in the first position 97.

Figure 5B:
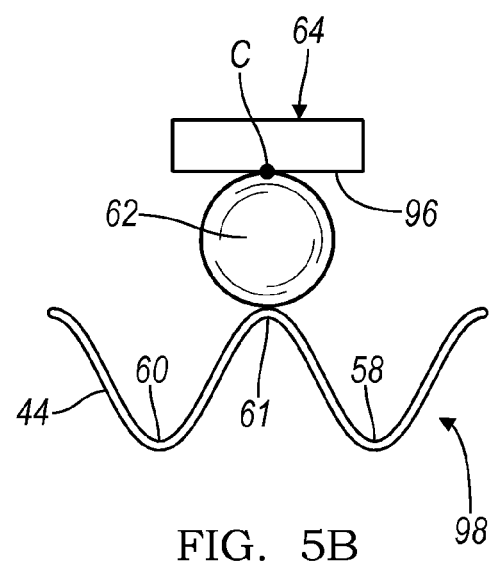
FIG. 5B is a schematic view of a portion of the cantilever detent assembly of FIGS. 1-5A in the second position, in accordance with the principles of the present disclosure.

Referring now to FIGS. 5A-5B, the reverse lever 44 is rotated into a second position 98 (also shown in dashed lines in FIG. 2). In the second position 98, the reverse lever 44 has been rotated about the pivot point P, around the detent housing 70. Accordingly, the raised portion 61 of the reverse lever 44 is moved so that it is disposed under the ball 62, and the ball 62 is disposed directly between the raised portion 61 and the center C of the wall 96 of the spring plate 64. In the second position 98, the ball 62 is no longer seated in the first groove 58, nor is the ball 62 seated in the second groove 60. Moving the lever 44 so that the ball 62 is disposed atop the raised portion 61 in the second position 98 forces spring plate upward and out of the horizontally flat orientation, so the spring plate 64 extends in an acute angle α from horizontal (in the orientation of FIG. 5A). In other words, the spring plate 64 extends at an angle α from the central axis X of the detent housing 70. For example, the spring plate 64 extends at an angle α between 5 and 45 degrees from the central axis X of the detent housing 70. In FIGS. 5A-5B, the reverse lever 44 has been rotated about the detent housing 70 from the first position 97 to the second position 98. The ball 62 has remained along the plane A-A, but has translated in an upward direction (in the orientation of FIG. 2) along the plane A-A within the opening 56 of the reverse lever 44.

Figure 5C:
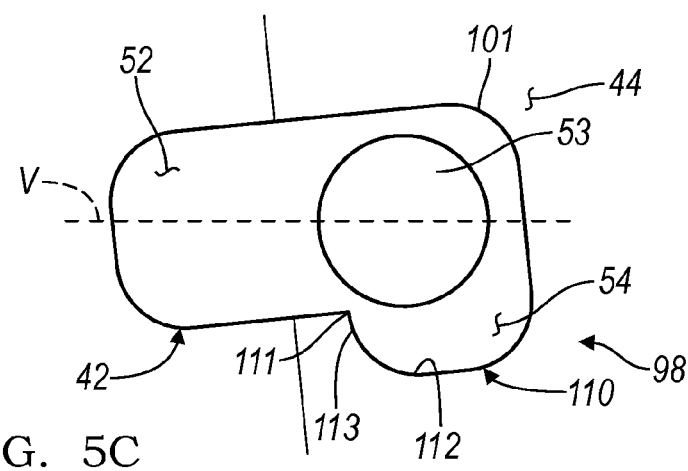
FIG. 5C is a schematic of a portion of the shifting assembly of FIG. 1 including a portion of the cantilever detent assembly of FIGS. 1-5B in the second position, according to the principles of the present disclosure.

FIG. 5C illustrates the position of the lever 44 with respect to the pin 53 in close-up detail, when the lever 44 is in the second position 98.

The reverse lever 44 may then be rotated further from the first position 97 into a third position 99, shown in dashed lines in FIG. 2. The third position 99 is rotated further from the first position 97 than the second position 98. In the third position, the reverse lever 44 has been rotated about the pivot point P, around the detent housing 70 a greater radial distance from the first position 97 than the second position 98. In other words, the reverse lever 44 is turned a first radial distance A from the first position 97 to the second position, and the reverse lever 44 is turned a second radial distance B from the first position 97 to the third position 99 (through the second position 98), where the second radial distance B is greater than the first radial distance A.

Figure 6A:
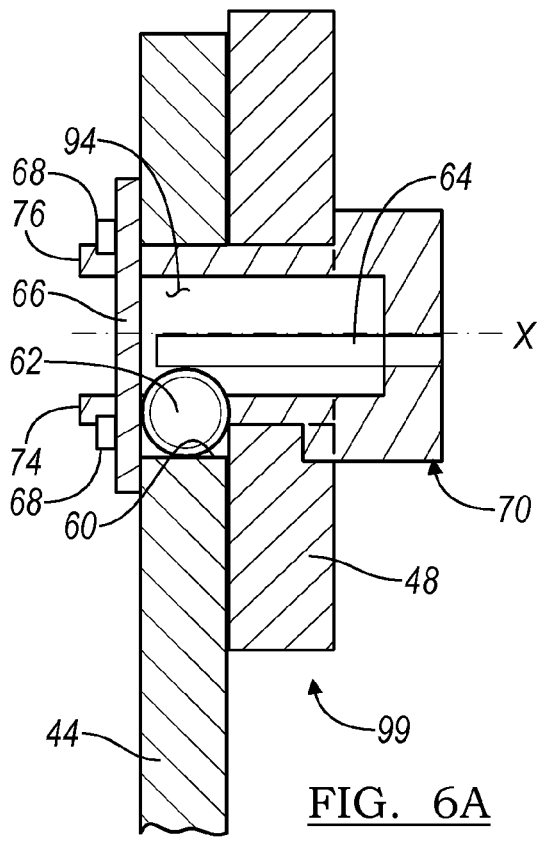
FIG. 6A is a side cross-sectional view of the cantilever detent assembly of FIGS. 1-5B in a third position, taken along the line A-A of FIG. 2, according to the principles of the present disclosure.
Figure 6B:
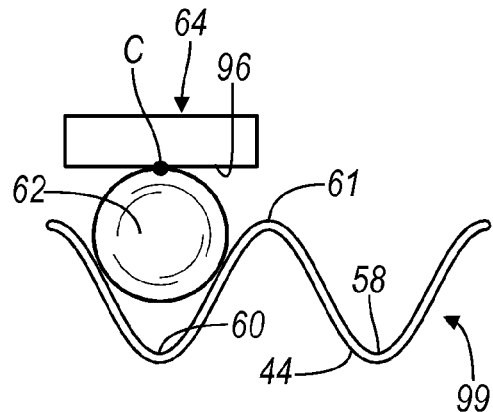
FIG. 6B is a schematic view of a portion of the cantilever detent assembly of FIGS. 1-6A in the third position, in accordance with the principles of the present disclosure.

Accordingly, going from the first position 97 to the third position 99, the reverse lever 44 is rotated first so that the raised portion 61 of the reverse lever 44 is disposed under the ball 62, and the ball 62 is disposed directly between the raised portion 61 and the center C of the wall 96 of the spring plate 64 (as shown in FIGS. 5A-5B), and then the reverse lever 44 is rotated further into the third position 99 so that the ball 62 is disposed, or seated, in the second groove 60, as shown in FIGS. 6A-6B. In the third position 99, the ball 62 is no longer seated in the first groove 58, nor is the ball 62 located atop the raised portion 61; instead, the ball 62 is seated in the second groove 60 in the third position 99. Moving the reverse lever 44 so that the ball 62 is seated in the second groove 60 in the third position 99 allows the spring plate 64 to come back down from its location in the second position 98, so that the spring plate 64 is again in a horizontally flat orientation as shown in FIG. 6A. In other words, the spring plate 64 is parallel to or collinear with a central axis X of the detent housing 70. The spring plate 64 biases the ball 62 into the second groove 60 in the third position 99. In FIGS. 6A-6B, the reverse lever 44 has been rotated about the detent housing 70 from the first position 97, through the second position 98, to the third position 99. The ball has remained along the plane A-A, but has translated in an upward direction (in the orientation of FIG. 2) along the plane A-A, and then in a downward direction along the plane A-A, within the opening 56 of the reverse lever 44.

Figure 6C:
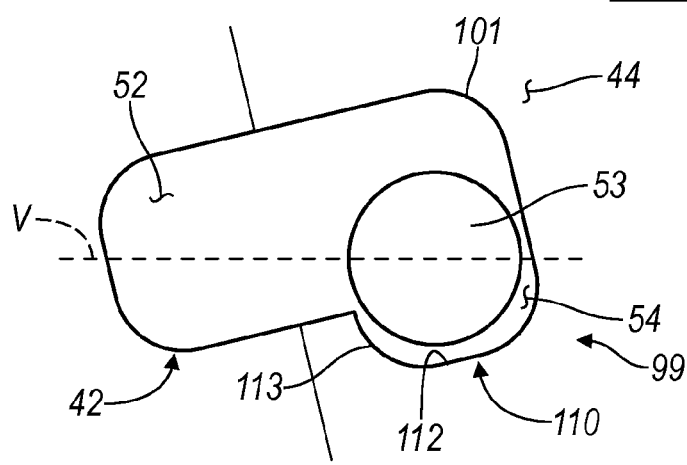
FIG. 6C is a schematic of a portion of the shifting assembly of FIG. 1 including a portion of the cantilever detent assembly of FIGS. 1-6B in the third position, according to the principles of the present disclosure.

Referring now to FIG. 6C, the pin 53 is illustrated in the slot 42 in the reverse gear engaging position 99, at a distal end 110 of the second channel 54, adjacent to an end face 112. To move from the reverse gear speed to a neutral position (or the forward gear), the pin 53 must be moved into a neutral position at the intersection of the first and second channels at the corner 101 of the L-shaped slot 42. However, upon attempting to translate the pin 53 along a horizontal axis V, as the shift rail 20 and yoke 34 move along parallel horizontal axes, the pin 53 exerts pressure on a side surface 113 of the second channel 54, without immediately translating into the neutral corner 101.

Referring to FIGS. 4B and 5B, the lever 44 then exerts enough force on the ball 62 and spring plate 64 to move the raised portion 61 of the lever 44 under the ball 62 and spring plate 64, and into the second position 98 illustrated in FIGS. 5A-5B. Referring to FIG. 5C, the lever 44 then moves with respect to the pin 53, such that the pin 53 is then located at a position nearly at the intersection of the first and second channels 52, 54, adjacent to the inner corner 111 of the L-shaped slot 42. The pin 53 always remains disposed along the horizontal axis V, but the pin 53 may translate along the axis V.

After moving to the second position 98, the lever 44 moves further back toward the first position 97, so that the ball 62 seats in the first groove 58 in the first position 97 (as in FIGS. 3A-3B). Referring to FIG. 4C, as the ball 62 is seated in the first groove 58, the lever 44 is moved further with respect to the pin 53 from the position of FIG. 5C to the neutral position at the wherein the pin 53 is located at the corner 101 of the lever 44, wherein the first and second channels 52, 54 meet. Accordingly, the cantilever detent assembly 46, including the lever 44 having first and second grooves 58, 60, assists the pin 53 in returning to the neutral position after engaging the reverse gear 18, because the lever 44 is translated with respect to the pin 53, moving the surface 113 away from the pin 53, such that the pin 53 rests in the corner 101 located a distance g from the surface 113 of the lever 44.

Thus, the lever 44 is rotated about the pivot point P, and the first groove 58 is located a first distance D1 from the pivot point P, while the second groove 60 is located a second distance D2 from the pivot point P. The first and second distances D1, D2 may be equal in magnitude, but they are not oriented along the same plane from the pivot point P. In other words, the planes disposed along the first and second distances D1, D2 intersect at the pivot point P and are not coplanar. In addition, the grooves 58, 60 are not located at the same point as the pivot point P; instead, each of the grooves are located a distance D1, D2 away from the pivot point P.

The ball 62 is, therefore, configured to selectively seat in the first groove 58, and the ball 62 is further configured to selectively seat in the second groove 60, as the reverse lever 44 is rotated around the detent housing 70 and the pivot point P. The spring plate 64 is configured to selectively bias the ball 62 into the first groove 58, and the spring plate 64 is further configured to selectively bias the ball 62 into the second groove 60. The reverse lever 44 is movable with respect to the ball 62 to seat the ball 62 in the first and second grooves 58, 60. Therefore, the cantilever detent assembly 46 selectively engages the reverse idler gear 18 when the reverse lever 44 is rotated. The reverse idler gear 18 is disengaged when the reverse lever 44 is in the first position 97, and the reverse idler gear 18 is engaged when the reverse lever 44 is in the third position 99.

It will be appreciated that the location and particular embodiments of the shift rails 20, 22, 24 and yokes 34, 36, 38 could have various other configurations without departing from the spirit and scope of the present disclosure. In addition, the particular embodiments of the cantilever detent assembly 46 illustrated in the figures could have variations within the spirit and scope of the claims. The description of the invention is merely exemplary in nature and variations that do not depart from the gist of the invention are intended to be within the scope of the invention. Such variations are not to be regarded as a departure from the spirit and scope of the invention.

What is claimed is:

1. A detent assembly for selectively engaging a gear in a transmission of a motor vehicle, the detent assembly comprising:
    a lever having a first end, a second end, a circular opening, a first groove and a second groove, and wherein the first end of the lever being configured to selectively engage a gear, the opening is disposed proximate the second end, and the first and second grooves are disposed on an inner periphery of the opening;
    a ball configured to selectively seat in the first groove, the ball being further configured to selectively seat in the second groove; and
    a plate configured to selectively bias the ball into the first groove, the plate being further configured to selectively bias the ball into the second groove.

2. The detent assembly of claim 1, the lever being moveable with respect to the ball to seat the ball in the first and second grooves.

3. The detent assembly of claim 2, the lever having portions forming an opening in the lever, the lever having a raised portion protruding into the opening, the first and second grooves being separated by the raised portion.

4. The detent assembly of claim 3, the lever being rotatable about a pivot point, the first groove being formed a first distance from the pivot point and the second groove being formed a second distance from the pivot point.

5. The detent assembly of claim 4, further comprising a detent housing, the detent housing being fixedly connected to the plate.

6. The detent assembly of claim 5, wherein the lever is configured to rotate with respect to the detent housing.

7. The detent assembly of claim 6, wherein the detent housing has a pair of retainer walls formed therein, the pair of retainer walls being disposed adjacent to the ball.

8. The detent assembly of claim 7, further comprising a retainer ring, the detent housing having an outer wall, the outer wall forming an indentation therein, the retainer ring being disposed around the outer wall of the detent housing in the indentation.

9. The detent assembly of claim 8, the retainer ring and the retainer walls cooperating with the plate to hold the ball at least partially within the detent housing.

10. The detent assembly of claim 9, wherein the detent housing has a generally cylindrical shape.

11. The detent assembly of claim 10, wherein opening of the lever is formed through the pivot point, the portions forming the opening being disposed around the outer wall of the detent housing.

12. The detent assembly of claim 11, the lever having portions forming an L-shaped aperture in the lever for engaging a pin.

13. A detent assembly for selectively engaging a gear in a transmission of a motor vehicle, the detent assembly comprising:
    a lever having portions forming an opening in the lever, the lever forming a first groove and a second groove therein and a raised portion separating the first and second grooves, the raised portion protruding into the opening, the lever being rotatable about a pivot point, the opening being formed through the pivot point, the lever being configured to selectively engage a gear;
    a ball configured to selectively seat in the first groove, the ball being further configured to selectively seat in the second groove;
    a plate configured to selectively bias the ball into the first groove, the plate being further configured to selectively bias the ball into the second groove;
    a cylindrical detent housing fixedly connected to the plate, the detent housing having a pair of retainer walls formed therein, the pair of retainer walls being disposed adjacent to the ball, the detent housing having an outer wall and portions forming an indentation in the outer wall, the lever being configured to rotate with respect to the detent housing, the portions forming the opening in the lever being disposed around the outer wall of the detent housing; and a retainer ring disposed around the outer wall of the detent housing in the indentation, wherein the retainer ring, the retainer walls, and the plate cooperate to hold the ball at least partially within the detent housing, wherein the lever is moveable with respect to the ball to selectively seat the ball in the first and second grooves.

14. A shifting assembly for a transmission of a motor vehicle, the shifting assembly comprising:
a plurality of shift rails for shifting the transmission into a plurality of gear ratios;
a shifting yoke coupled to a first shift rail of the plurality of shift rails;
a lever disposed on a cylindrical housing, the lever having portions forming a circular opening including a first groove and a second groove therein, the shifting yoke being configured to engage the lever;
a ball configured to selectively seat in the first groove, the ball being further configured to selectively seat in the second groove;
a plate configured to selectively bias the ball into the first groove, the plate being further configured to selectively bias the ball into the second groove; and
a shaft having a gear disposed thereon, the lever configured to selectively engage the gear.

15. The shifting assembly of claim 14, the lever having portions forming an opening in the lever, the lever having a raised portion protruding into the opening, the first and second grooves being separated by the raised portion.

16. The shifting assembly of claim 15, further comprising a detent housing, the detent housing being fixedly connected to the plate, the lever being configured to rotate with respect to the detent housing.

17. The shifting assembly of claim 16, wherein the detent housing has a pair of retainer walls formed therein, the pair of retainer walls being disposed adjacent to the ball.

18. The shifting assembly of claim 17, further comprising a retainer ring, the detent housing having an outer wall forming an indentation therein, the retainer ring being disposed around the outer wall of the detent housing in the indentation.

19. The shifting assembly of claim 18, the retainer ring and the retainer walls cooperating with the plate to hold the ball at least partially within the detent housing.

20. The shifting assembly of claim 19, the lever having portions forming an L-shaped aperture in the lever, the lever being engaged by the yoke through the L-shaped aperture.

* * * * *